Aug. 29, 1967     G. A. D. GORDON     3,338,235
ULTRASONIC THERAPEUTIC DEVICE WITH RECORDING APPARATUS
Filed Oct. 2, 1964     3 Sheets-Sheet 1

INVENTOR
George A. D. Gordon
BY Baldwin & Wight
ATTORNEYS

United States Patent Office 3,338,235
Patented Aug. 29, 1967

3,338,235
ULTRASONIC THERAPEUTIC DEVICE WITH
RECORDING APPARATUS
George A. D. Gordon, Friston House, 25 Church Road,
Richmond, Surrey, England
Filed Oct. 2, 1964, Ser. No. 401,001
Claims priority, application Great Britain, Oct. 23, 1963,
41,920/63
16 Claims. (Cl. 128—24)

ABSTRACT OF THE DISCLOSURE

A device for charting the interior of an organ and destroying limited groups of cells including focused ultrasonic transducer apparatus for delivering ultrasonic energy to the focal point thereof, a stereotaxic device for moving the transducer apparatus to effect movement of the focal point of the apparatus within the organ, a recording mechanism and mechanical linkage interconnecting the stereotaxic device and the recording mechanism. The recording mechanism is electrically connected to the transducer apparatus for plotting a point upon a recording surface each time an echo pulse is received from the focal point of the focused transducer apparatus.

The transducer apparatus may employ a single transducer the ultrasonic energy of which may be increased to the cell-destructive range or the transducer apparatus may employ two separate transducers one of which produces relatively weak ultrasonic energy for the mapping of the interior of the organ and the other of which provides relatively high degrees of ultrasonic energy for the destruction of certain preselected cells.

---

This invention relates to apparatus for destroying limited groups of cells.

In the apparatus described in United States patent application No. 277,309, and now Patent No. 3,237,623, the recording of a large number of coordinates in three planes at which an echo is obtained from the transducer focus will involve much time, labour and skill to convert this data into suitable graph, and the present invention is concerned with means for more easily recording this data and subsequently utilising it.

According to the present invention apparatus for destroying limited groups of cells comprises an ultrasonic transducer assembly which can be used to establish the anatomy of the body to be treated by using very weak ultrasonic energy impulses and for subsequently delivering to the focal spot strong ultrasonic energy impulses, including a stereotaxic device to permit the ultrasonic transducer assembly when in use to move about its focus in two directions along angled coordinates, and recording means actuated by operation of the stereotaxic device for recording the shape of the part being examined.

The stereotaxic device may thus be provided with a pointer which can move over a recording surface which is parallel with the planes of movement of the transducer assembly in use.

Conveniently a single pointer may be provided which can move through 90° so that it can be used in planes which are normal to each other.

In an alternative arrangement a single pointer is provided which can record on a single recording surface movement of the transducer in any plane.

When the apparatus is to be used for a small organ such as an eye or in small animals, a single pointer can be provided which is connected to the stereotaxic device through a device which acts to magnify the movements of the transducer.

The magnifying device may include a parallelogram linkage and in a convenient arrangement the linkage can be rotated through 90° to enable the pointer to record on the same surface for all movement of the transducer.

As mentioned in United States patent application No. 277,309 an industrial flaw-detector may be provided to which the transducer can be connected, and when such a flaw-detector is provided the pointer may be arranged to act on a recording surface of "teledeltos" paper electrical energy being supplied to the pointer so that it records on the paper when the signal obtained at the flaw-detector exceeds a predetermined value. "Teledeltos" paper is voltage sensitive paper, well known in itself, and only acts to indicate or record when a voltage is produced between a marker or pointer and the back of the paper. With this arrangement the pointer would be in constant contact with the paper but would only record when the signal obtained at the flaw-detector was sufficient to produce a voltage at the paper.

Thus, a gate device may be applied to the signal obtained at the flaw-detector so that if an echo is obtained at a distance corresponding to the focus of the transducer a pulse will pass to the pointer. Such pulses would of course probably be amplified, and it will be appreciated that a systematic scan in two dimensions under these conditions would produce a large number of points which would tend to form lines. By altering the angulation of the transducer to make the rays strike the surface of the body being investigated perpendicularly and repeating the procedure these lines would be completed wherever it is possible.

Similarly when the ultrasonic transducer is being used to destroy cells by the use of the high power the position of the areas of destruction produced could be marked on the same piece of paper by manual operation, or automatically by suitable interconnection.

In an alternative arrangement the transducer assembly may include a pair of transducers, one of which is arranged for operation at low power to establish the anatomy of the body to be treated, and the other to be arranged for operation at high power to deliver the strong ultrasonic energy to destroy or treat the body.

The invention also includes a method of operating a transducer assembly which includes establishing the anatomy of a body to be treated by using very weak ultrasonic energy pulses and recording the shape of the body with recording means operated by a stereotaxic device which supports the transducer in use, and then utilising the recording means to position the stereotaxic device and using the transducer assembly to destroy or treat the body.

The invention may be performed in various ways but two embodiments will now be described by way of example and with reference to the accompanying drawings in which.

Figure 1:
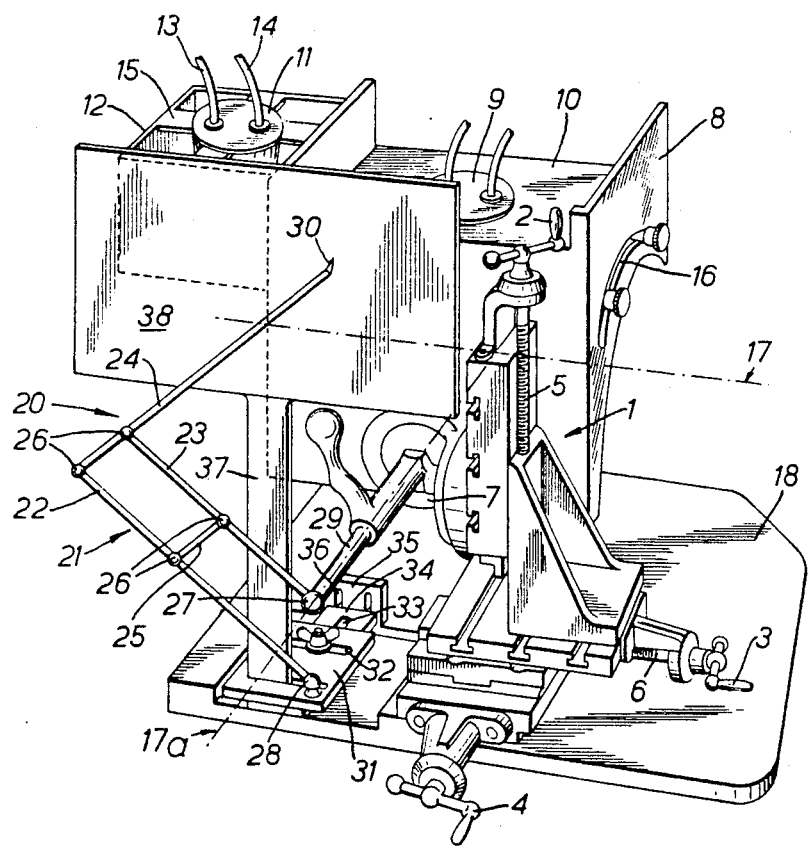
FIGURE 1 is an isometric view of one embodiment of the invention.

In the arrangement shown in FIGURE 1 the apparatus is substantially the same as that described in United States patent application No. 277,309 but means are provided to record the operation of the stereo-taxic device and the transducer assembly includes two transducers.

The stereo-taxic device indicated generally by the reference numeral 1 comprises three sliding platforms which can be arranged to move at right angles to each other by means of operating handles 2, 3 and 4 which control the rotation of lead screws, two of which can be seen at 5 and 6. The stereotaxic device is connected at 7 to a transducer assembly support 8, the transducer in use 9 being carried by a support platform 10. The other transducer 11, when not in use is carried in a bath 12 to which a saline solution is supplied so that the transducer can be maintained at the correct operating temperature, and this transducer is connected into an appropriate operating circuit by leads 13, and a pipe line 14 which supplies saline solution to the transducer when in use can also remain connected. When it is desired to interchange the transducers it is merely necessary to lift the transducer 11 from its tank 12 in which it is supported by arms 15 and place it in position in the platform 10, the other transducer 9 replacing it in the tank 12.

The support platform 10 can move in arcuate slots 16 so that it is rotated about a predetermined axis which passes through the focus of the transducer indicated by the broken line 17. Similarly the support 8 is pivoted to the stereotaxic device at 7 so that it can also pivot about the axis indicated by the broken line 18 which again passes through the focus of the transducer.

The stereotaxic device 1 is mounted on a support platform 18 and it will be appreciated that operation of the handles 2, 3 and 4 will cause the support 8 to move through Cartesian coordinates.

The present invention provides means for indicating the movement of the transducer carried by the platform 10 so that the anatomy of the body to be operated upon can be determined, and this is achieved by causing the stereotaxic device to operate a pointer which will mark the progress of the transducer in a desired plane. When a series of such readings has been taken, preferably in planes at right angles to each other, the complete anatomy of the body concerned can be ascertained.

When the apparatus is to be used for small organs, for example the eye, or in small animals, the movement of the pointer in relation to the movement of the transducer is preferably magnified and in the embodiment being described the recording means includes apparatus for including such magnification. Thus, the recording means, indicated generally with reference numeral 20 includes a parallelogram linkage 21 comprising two parallel members 22, 23 of substantially the same length, referred to herein as the first parallelogram members, and two members 24, 25 of different lengths which are pivotally connected at 26 to the first parallelogram members 22, 23. These members are arranged so that movement of one end of the member 23 causes magnified movement of one end of the member 24. The parallelogram linkage is mounted on the base plate 18 with the ends of the members 22, 23 connected to universal joints 27, 28. Thus, the whole linkage can be rotated through 90°. The joint 27 is connected to an extension 29 connected to the support 8 so that, in the position shown in FIGURE 1, movement of the support 8 from right to left, caused by operation of the handle 3 causes corresponding but magnified movement of a pointer 30 carried on the end of the member 24. The precise amount of magnification is of course dependent upon the proportions of the parallelogram linkage. When the linkage is moved through 90° about the universal joints 27 and 28, movement of the support 8 along the axis 17, caused by operation of the handle 4 will again produce appropriate movement of the pointer 30 in this plane.

Universal joint 28 is rigidly secured to a platform member 31 in which is provided a slot 32, a locking bolt passes through the slot 32 and also through a slot 33 at right angles to the slot 32 in a second platform 34. This platform 34 is in turn carried by an end support 35 which is provided with a pair of slots 36 through which pass studs, not shown, so that the vertical position of the second platform 34 can be adjusted. As the slots 32 and 33 are at right angles to each other the platform 31 can be moved about Cartesian coordinates so that the pivot 28 can always be aligned directly beneath the pivot 27 for any position of the transducer 9.

Connected beneath the pivot 28 and arranged so that it can pivot through 90° in sympathy with the parallelogram linkage is a pillar 37 which carries a mounting 38 on which "teledeltos" paper can be secured. The arrangement is such that the recording surface of the "teledeltos" paper is always normal to the pointer 30 so that it can act upon it. In order to avoid complication, the electrical connection to the "teledeltos" paper and the pointer have been omitted from FIGURE 1. Thus, movement of the transducer in one plane will be recorded by the pointer and magnified, and when the transducer is to be moved through planes at right angles to that shown in the drawings, the parallelogram linkage can be swung through 90° so that a suitable recording can again be taken of the movement in the second plane. With this apparatus it is possible to trace out the shape of the organ being examined as if it had been cut through in two planes, and a recorded trace can be set out on a single recording surface if required.

Figure 2:
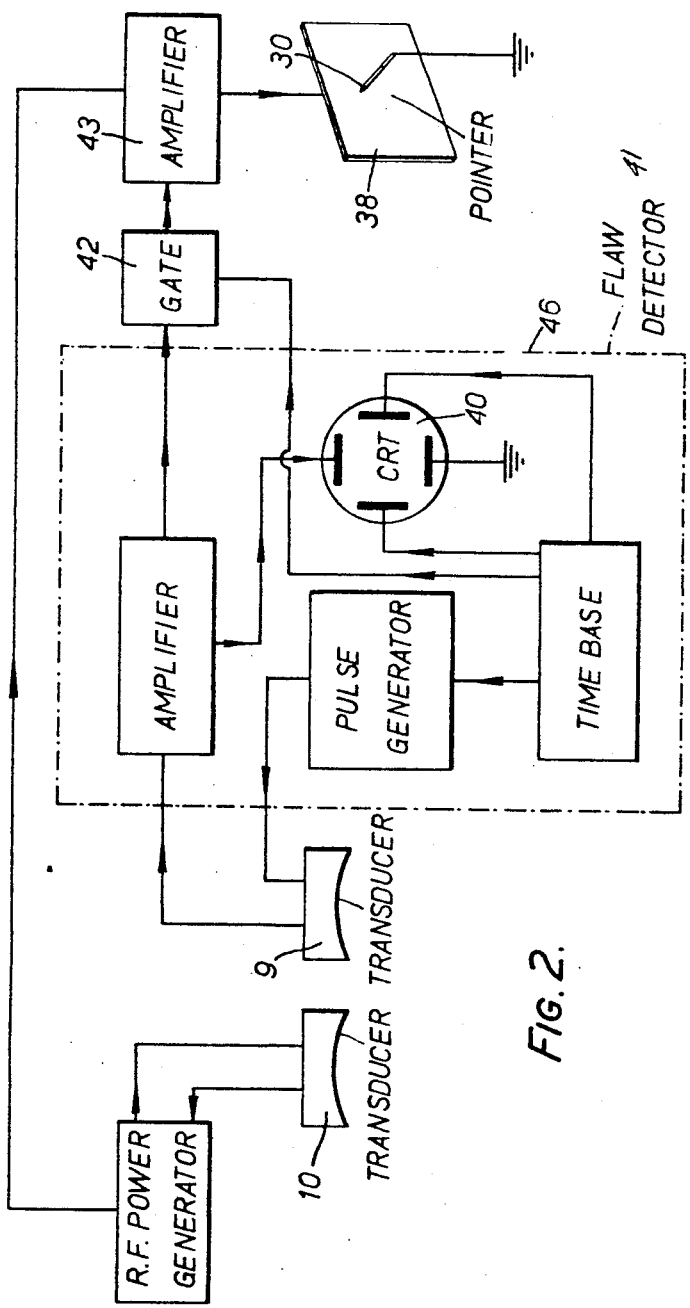
FIGURE 2 is a circuit diagram for an arrangement using a pair of transducers, and, FIGURE 3 is a circuit diagram for an arrangement including a single transducer which can be used for both high and lower power.

As shown in FIGURE 2, two basic electric circuits are employed from two transducers and the apparatus can be used so that the low power transducer is used to obtain a reading on the cathode ray tube 40 of the flaw-detector 41. The flaw-detector 41 is provided with a gate device 42 so that if an echo is obtained from a distance corresponding to the focus of the transducer in use in the support platform 10 a pulse will pass the gate every time the crystal transmits, but echoes occurring at any other distance will not pass the gate. These pulses are amplified by an amplifier 43 and pass on to the pointer 30 so that a mark is made on the "teledeltos" paper. A systematic scan in both Cartesian coordinates under these conditions will produce a large number of points which would tend to form lines, or by altering the angulation of the transducer, by, for example, tipping the support platform 3 and repeating the procedure these lines can be completed whenever it is possible to make the rays strike the surface of the object under consideration perpendicularly.

When the high power is used to destroy the cell, the other transducer is used and is positioned by placing the pointer 30 in an appropriate position. The signals from the low power transducer may merely outline the object to be destroyed, and it may therefore be necessary to alter the position of the pointer 30 so that it is slightly different from that indicated by the low power transducer. These points are however easily ascertained from the diagram on the "teledeltos" paper and with the pointer in the appropriate desired position the high power can now be applied to destroy the cells. The position of the area of destruction can if desired be similarly marked on the same piece of paper by arranging for the high power circuit to operate the pointer as shown. Thus, it will be seen that a complete record will automatically be obtained for not only the scanning of the body concerned but also the destruction of the cells, and the pattern secured on the "teledeltos" paper can be utilised to re-position the high power transducer.

Figure 3:
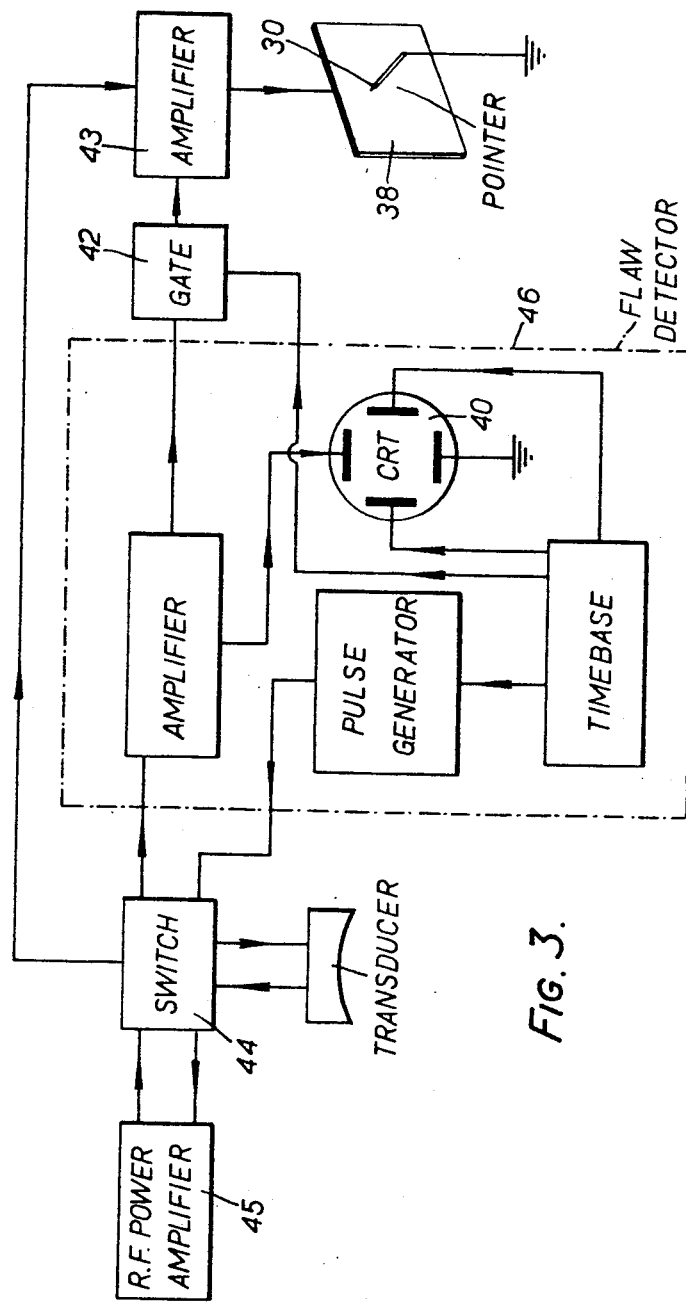

If desired, the transducer assembly may include only one transducer of the kind set forth in copending United States patent application No. 277,309 in which the concave bowl of the ultrasonic transducer comprises a mosaic of separate bowls all with the same focus, and some of the components are damped by permanent dampers and used for flaw-detecting purposes, and others are air backed to operate with the high power for destroying the cells. The large and small areas of the silvering can be obtained from a different number of components or by using double silvering on each component and connecting small areas each together and large areas each together as set forth in the earlier patent application referred to. When such a transducer is to be used with the present invention, a circuit such as that shown in FIGURE 3 may be utilised in which a switch 44 acts to connect the transducer to either the R.F. power amplifier 45 to provide high power to destroy the cells or to the flaw-detector indicated generally at 46 at the same time switching in the small areas of silvering so that only the very low power pulse is obtained and the signal is given on the cathode ray tube 40. A gate 42 and amplifier 43 may again be incorporated in this circuit to provide the current for operation of the pointer and it will be seen that provision is also made for operating the pointer through the amplifier 43 when the high power is used.

I claim:
1. A method of operating a transducer assembly which includes establishing the shape of a body to be treated by using very weak ultrasonic energy pulses and recording the shape of the body with recording means operated by a stereotaxic device which supports the transducer in use, and then utilising the recording means to position the stereotaxic device and using the transducer assembly to destroy or treat the body.

2. A method of operating a transducer assembly comprising a pair of transducers which includes establishing the anatomy of a body to be treated by using very weak ultrasonic energy pulses from one transducer and recording the shape of the body with recording means operated by a stereotaxic device which supports the transducer in use, and then using the other transducer to destroy or treat the body utilising the recording means to position the stereotaxic device which now supports the high power transducer.

3. Apparatus for destroying limited groups of cells comprising an ultrasonic transducer assembly including focused transducer means for establishing the anatomy of a body to be treated, said transducer means comprising means for causing said tranducer means to provide very weak ultrasonic energy pulses and means for causing said transducer means to deliver to the focal point of said focused transducer means strong ultrasonic energy pulses, a stereotaxic device mounting said focused transducer means for movement about its focal point in two directions along angled coordinates, a recording surface, recording means for marking said surface in accordance with the operation of said transducer assembly for recording the shape of the part being examined, and mechanical connecting means extending operatively between said stereotaxic device and said recording means for transmitting movement of said stereotaxic device to said recording means.

4. Apparatus according to claim 3 wherein said recording means comprises a pointer, and said mechanical connecting means comprises pointer mounting means mounting said pointer for movement over said recording surface substantially parallel with the planes of movement of said transducer assembly.

5. Apparatus according to claim 3 wherein said transducer assembly comprises a first, low power transducer for establishing the anatomy of the body to be treated, and a second, high power transducer for delivering strong ultrasonic energy to destroy or treat the body.

6. Apparatus according to claim 4 wherein said pointer mounting means is movable through 90° for positioning said pointer for recording movement in planes normal to each other.

7. Apparatus according to claim 4 wherein said recording surface is a single recording surface and said pointer mounting means mounts said pointer for recording upon said single recording surface the movement of said transducer assembly in any plane of movement thereof.

8. Apparatus according to claim 4 further comprising an industrial flaw detector electrically connected to said transducer assembly.

9. Apparatus according to claim 7 wherein said pointer mounting means comprises means for magnifying the movement of said transducer assembly.

10. Apparatus according to claim 9 wherein said means for magnifying comprises a parallelogram linkage.

11. Apparatus according to claim 10 wherein said recording surface is a single recording surface, and said linkage being rotatably mounted for rotation through 90° whereby said linkage mounts said pointer for recording upon said single recording surface the movement of said transducer assembly in any plane of movement thereof.

12. Apparatus according to claim 8 wherein said recording surface comprises a surface of electrically sensitive paper, said apparatus including means responsive to echo pulses from said transducer for supplying energy to said pointer for marking said teledeltos paper.

13. Apparatus according to claim 12 wherein said means responsive to echo pulses comprises a gate device responsive to echo pulses from said transducer corresponding to echos obtained by said transducer at distances substantially equal to the focus distance of said transducer for passing electrical pulses to said pointer.

14. Apparatus according to claim 11 wherein said transducer assembly comprises a first, low power transducer for establishing the anatomy of the body to be treated, and a second, high power transducer for delivering strong ultrasonic energy to destroy or treat the body.

15. Ultrasonic apparatus comprising focused transducer means including means for delivering ultrasonic energy to the focal point of said focused transducer means, a stereotaxic device mounting said focused transducer means for movement, a recording surface, recording means movable across said surface for marking said surface, mechanical connecting means structurally interconnecting said stereotaxic device and said recording means for transmitting movement of said transducer means to said recording means.

16. Apparatus according to claim 15 further comprising electrical means electrically interconnecting said transducer means and said recording means and responsive to an ultrasonic echo from substantially the focal point of said focused transducer means for actuating said recording means to cause said recording means to indicate on said surface a point corresponding to the point from which said echo was received.

References Cited
UNITED STATES PATENTS 3,086,390    4/1963    Brown           128—24.5 X
3,117,571    1/1964    Fry et al.

RICHARD A. GAUDET, *Primary Examiner.*

L. W. TRAPP, *Examiner.*